United States Patent
Guay et al.

(12) 
(10) Patent No.: US 6,374,257 B1
(45) Date of Patent: Apr. 16, 2002

(54) METHOD AND SYSTEM FOR REMOVING AMBIGUITIES IN A SHARED DATABASE COMMAND

(75) Inventors: Todd Guay, Nashua, NH (US); Vipul Shah, Mountain View, CA (US); Jonathan Soule; Yao Feng, both of Belmont, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/334,362

(22) Filed: Jun. 16, 1999

(51) Int. Cl.$^7$ ................................................ G06F 17/30
(52) U.S. Cl. ........................ 707/103 R; 707/4; 707/101; 707/102
(58) Field of Search .......................... 707/103 R, 101, 707/102, 4; 717/1, 5

(56) References Cited

U.S. PATENT DOCUMENTS

| | | | | |
|---|---|---|---|---|
| 5,291,583 A | * | 3/1994 | Bapat ............................ | 717/5 |
| 5,924,088 A | | 7/1999 | Jakobsson et al. ............ | 707/2 |
| 5,950,186 A | | 9/1999 | Chaudhuri et al. ........... | 707/2 |
| 6,003,022 A | | 12/1999 | Eberhard et al. ............. | 707/2 |
| 6,012,067 A | * | 1/2000 | Sarkar ......................... | 707/103 |
| 6,122,641 A | * | 9/2000 | Williamson et al. .......... | 707/103 |
| 6,195,653 B1 | | 2/2001 | Bleizeffer et al. ............ | 707/2 |
| 6,285,997 B1 | * | 9/2001 | Carey et al. .................. | 707/4 |

OTHER PUBLICATIONS

H.K. Wong et al. (IEEE publication, 3–2000) discloses an object relational database managment styem (ORDBMS) using frame model approach, Dept. of Elect. Engineer. Hong Kong, paper in Information Technology: Coding and computing Proc., pp. 375–379.*

* cited by examiner

*Primary Examiner*—Thomas Black
*Assistant Examiner*—Diane D. Mizrahi
(74) *Attorney, Agent, or Firm*—Hickman Palermo Truong & Becker LLP; Carl L. Brandt

(57) ABSTRACT

A method and apparatus for identifying one or more schemas from which a Structured Query Language (SQL) statement may have been executed is provided. According to the method, to identify schemas from which a database command may have been executed a set of object references that are included in the database command is determined. From the set of object references, one or more ambiguous object references that are contained in the set of object references are identified. A set of one or more schemas that contain objects that correspond to each of the one or more ambiguous object references is then identified. In one aspect, the step of identifying the one or more ambiguous object references includes the steps of identifying any qualified object references from the set of object references that is associated with a schema identifier that identifies a particular schema for which the qualified object reference is to execute; identifying any public synonyms from the set of object references that represents an alias that may be used in multiple schemas to identified a single object; and determining the one or more ambiguous object references by selecting from the set of object references only those object references that have not been identified as either qualified object references or public synonyms.

21 Claims, 10 Drawing Sheets

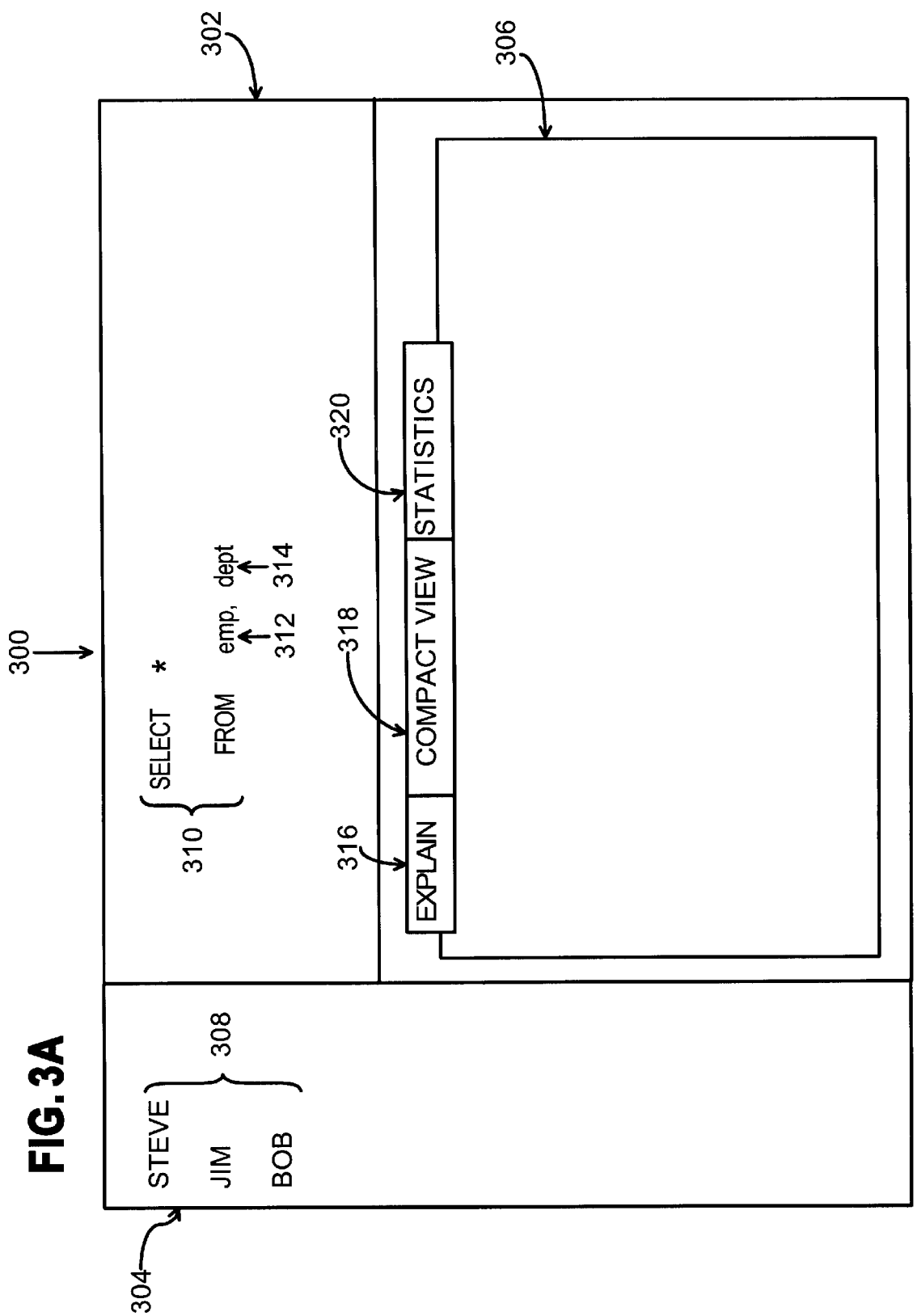

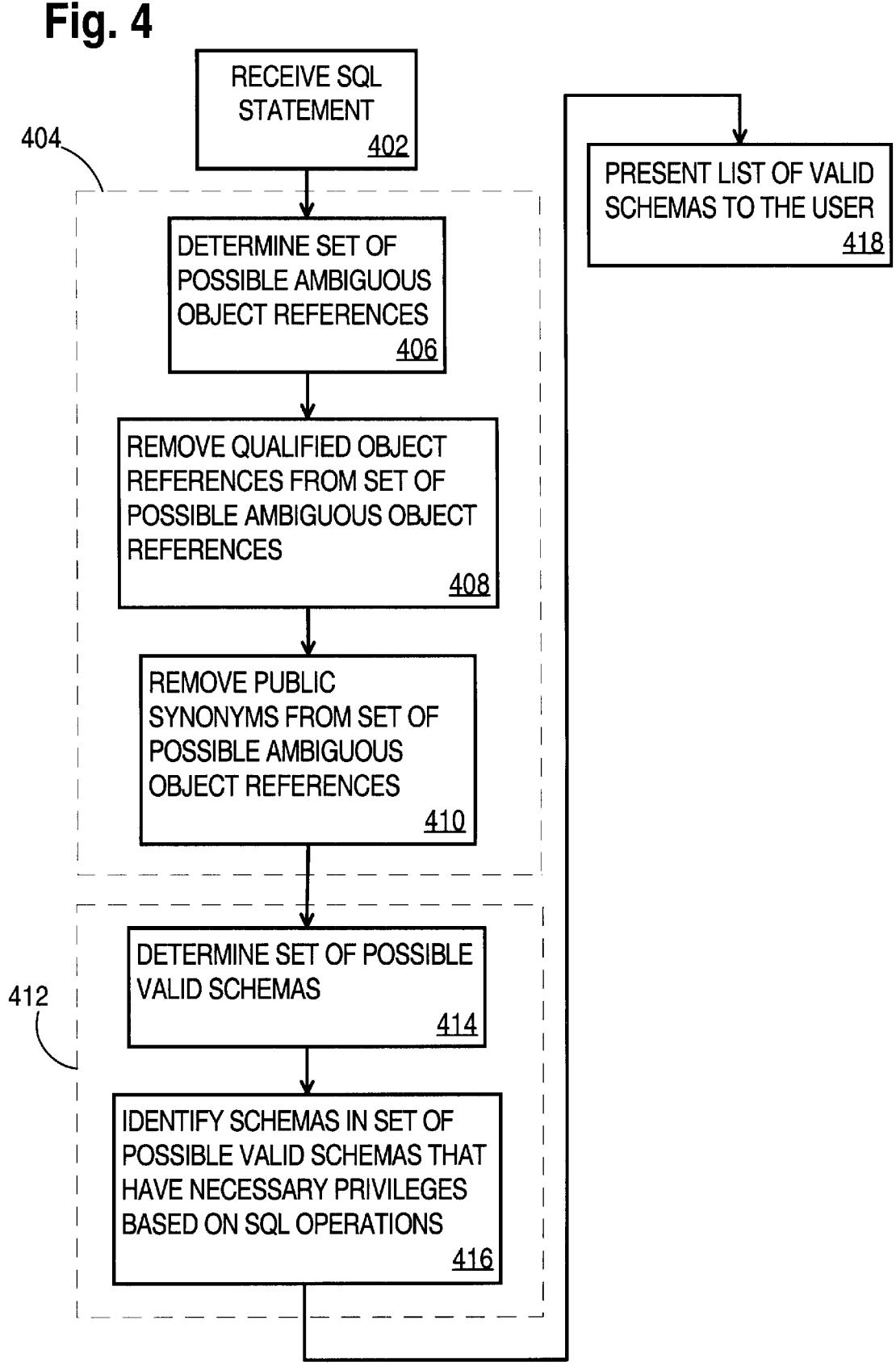

METHOD AND SYSTEM FOR REMOVING AMBIGUITIES IN A SHARED DATABASE COMMAND

RELATED APPLICATIONS

The present Application is related to the following Application: U.S. patent application Ser. No. 09/256,810, entitled "Automatically Determining Data That Is Best Suited For Index," filed by Todd Guay, Gregory Smith, Gaylen Royal and Cheryl Mrozienski on Feb. 24, 1999.

FIELD OF THE INVENTION

The present invention relates to database systems, and more specifically, to a mechanism for removing ambiguities in a shared database command.

BACKGROUND OF THE INVENTION

In typical database systems, users store, update and retrieve information by submitting commands to a database server. To be correctly processed, the commands must comply with the database language that is supported by the database server. One popular database language is known as Structured Query Language (SQL).

The response time of a finely-tuned database can be adversely affected by only a tiny proportion of the workload. A challenge that is encountered by most database administrators ("DBA") is how to constantly ensure that the performance of a database is not degraded due to execution of resource-intensive database commands.

In many cases, a database command may be highly resource-intensive due to certain inefficiencies that were introduced by the application that generated the database command. Database commands that fall into this category are referred to herein as "poorly performing database commands". For example, if the application SQL is written in a way that prevents the optimizer from using an available index, in executing the database command, the database server will typically be required to perform a full scan of the table in order to determine the correct rows. By having to execute a full scan of the table, the database server is required to process a greater number of rows than would normally be required if the rows were selected using a proper index. Thus, by building the index on the table, or by modifying the application to generate an alternate database command that reduces the number of rows that need to be scanned, the resources required by the database command can be reduced. In addition, because a database command may be repeatedly executed, often by multiple database users, the tuning of the database command can significantly increase the performance of a database system.

For database systems that support the SQL database language, database commands typically take the form of SQL statements. In general, the initial step in tuning the workload of a database system that supports SQL consists of identifying the SQL statements that are highly resource-intensive, and thus inflicting the most damage on the performance of the database system.

One method of capturing the metrics of poorly performing database commands is by tracing the execution of SQL statements as they are executing in the database system. In particular, by executing a tracing mechanism, the relevant details of a statement's execution can be captured. The details of the statement's execution can then be examined to identify any inefficiencies that were introduced by the application program in generating the SQL statement.

However, a drawback with tracing the execution of an SQL statement is that the tracing mechanism itself requires a vast amount of resources to execute and thus introduces a significant amount of overhead into the database system. In many cases, the cost of turning on the tracing mechanism is so prohibitive as to dissuade the DBA from arbitrarily tracing the SQL statements executing in the database system. Thus, the tracing mechanism is typically only enabled and started after the performance of the database system has already significantly declined.

Another method of identifying highly resource-intensive SQL statements involves reviewing the metric information that is associated with the different SQL statements that are executing in the database system. The metrics for a particular SQL statement can provide such details as the execution time, the I/O count, the number of sorts, and the rows processed while executing the particular SQL statement. By examining the metric information that is associated with SQL statements executing in the database system, the DBA can identify those SQL statements that impact the database most heavily.

For example, in certain database systems, such as the Oracle™ database system, in executing SQL statements, the database system maintains the SQL statements and their aggregated metrics in a shared cache. The metrics may include, for example, the number of I/O operations performed during execution of the query and the number of times the query has been executed. Thus, by inspecting the metric information, a DBA can determine the per-execution metrics for that particular SQL statement, and thus identify poorly performing SQL statements.

After a poorly performing query has been identified, the database may be "tuned" to allow the query to perform more efficiently. The process of tuning the database for executing the queries may involve, for example, creating new indexes that can be used to process the queries. To know how to tune a database for a query, the schema against which the query is executed must be known. For example, if a poorly performing query is executed against an "emp" table in one schema, performance of the query would not be benefited by building an index on an "emp" table in a different schema.

Unfortunately, it is not always clear what schema context was used to execute a query. For example, to limit the amount of resources that are required to maintain the shared cache area, the database system maintains a single entry for each distinct SQL statement, regardless of how many different schemas execute the SQL statement. SQL statements for which only a single cache entry is maintained, but which have been issued from more than one schema, are referred to as "shared SQL statements".

Thus, it is possible for two users to issue separate SQL statements from different schemas but have both SQL statements map to the same shared cache entry, thus causing the aggregated metrics in the shared cache to reflect the sum of the statistics across both users for the given statement. For example, if user "A" using a schema "X" context and user "B" using a schema "Y" context, each execute the SQL statement:

SELECT "name", "salary", "dept_num"
FROM emp, dept
WHERE emp.name=dept.emp_name
AND emp.salary>50000.

both statements will map to the same cache entry even though the two statements were executed in different schema contexts.

In this example, the table objects "emp" and "dept" used in the query are ambiguous. An ambiguous object is an object that is identified using a name that applies equally to objects that belong to different schemas. In this example, schema "X" and schema "Y" both have tables named "emp" and "dept", thus rendering the object names "emp" and "dept" ambiguous in the SQL statement.

One common way to refer to objects unambiguously is to qualify the ambiguous object name with the name of the schema that contains the desired object. For example, the "emp" table in schema X would be referred to as X.emp, while the "emp" table in schema Y would be referred to as Y.emp. Because the SQL statement given above does not qualify the ambiguous names by a particular schema, there is no way of determining whether the SQL statement was executed by user "A" in the context of schema "X" or by user "B" in the context of schema "Y" by looking at the cache entry for the SQL statement.

Thus, the problem with having ambiguous objects in an SQL statement is that the particular schema that was used to execute the SQL statement can not be identified. Without knowing the particular schema that was used to execute the SQL statement, the DBA cannot execute the SQL statement within the same operating environment as the database user who originally ran the statement. This is important as the DBA needs to tune the statement from the context of the executing user.

For example, a "DEMO" schema and a "PRODUCTION" schema may both include a set of table objects "emp" and "dept". As such, the SQL statement:

SELECT *
FROM emp, dept may be executed using both the "DEMO" schema and the "PRODUCTION". However, the "DEMO" schema may include only a small number of entries in each of its table objects "emp" and "dept", while the "PRODUCTION" schema may include an extremely large number of number of entries in each of its table objects "emp" and "dept". Thus, by adding an index to the table objects "emp" and "dept" in the "PRODUCTION" schema, a DBA may be able to tune the database to cause the SQL statement to run significantly more efficient in the "PRODUCTION" schema. However, because the "DEMO" schema includes only a small number of entries in each of its table objects "emp" and "dept", adding an index to the table objects "emp" and "dept" in the "DEMO" schema will not cause the SQL statement to run significantly more efficient in the "DEMO" schema. In fact, the overhead that is associated with maintaining an index may actually reduce the efficiency of the database by adding an index to the table objects "emp" and "dept" in the "DEMO" schema. Thus, to properly to tune the database system, the DBA must be able to determine the schema from which an SQL statement having ambiguous object references was executed.

One method of determining the schema in which an SQL statement that includes ambiguous object references was executed involves having the DBA log into multiple user accounts in the hope that the schema context of one of the user accounts can resolve the ambiguous object references so that the statement can be executed. For example, by logging in as user "STEVE" the DBA is able to execute the SQL statement using STEVE's schema context. If the ambiguous object references can be resolved through STEVE's schema context, the SQL statement can properly execute. Thus, the DBA can identify STEVE's schema as a "valid" schema for executing the SQL statement. Conversely, if the ambiguous object references cannot be resolved through STEVE's schema context, the SQL statement will not properly execute and the DBA can identify STEVE's schema as an "invalid" schema for executing the SQL statement However, a significant drawback with this "solution" is that to login as the different users of the system, the DBA is forced to maintain personal login information for each of the different users of the system. In addition, having to login in as the different users to determine whether an SQL statement can be properly executed can be both extremely burdensome and time consuming to the DBA.

Based on the foregoing, there is a clear need to provide a mechanism that can identify the schema context that was used in executing an SQL statement that includes ambiguous references.

There is also a clear need to provide a mechanism that can determine the metrics for SQL statements that include ambiguous references.

SUMMARY OF THE INVENTION

The foregoing needs, and other needs and objects that will become apparent from the following description, are achieved in the present invention, which comprises, in one aspect, a method for identifying one or more schemas from which a Structured Query Language (SQL) statement may have been executed, the method comprising the computer-implemented steps of determining a set of object references that are included in the database command; identifying one or more ambiguous object references that are contained in the set of object references; and determining a set of one or more schemas that contain objects that correspond to each of the one or more ambiguous object references.

According to another feature, the step of identifying the one or more ambiguous object references includes the steps of identifying any qualified object references from the set of object references that is associated with a schema identifier that identifies a particular schema for which the qualified object reference is to execute; identifying any public synonyms from the set of object references that represents an alias that may be used in multiple schemas to identified a single object; and determining the one or more ambiguous object references by selecting from the set of object references only those object references that have not been identified as either qualified object references or public synonyms.

In another feature the step of determining the set of one or more schemas includes the step of identifying schemas that include a set of access permissions for accessing the one or more ambiguous object references as required by the database command.

In yet another feature, user input is received that identifies, from the set of one or more schemas, a selected schema for which tuning is to be performed. Based on the selected schema an explain plan for the database is generated by associating a schema identifier that identifies the selected schema with each of the one or more ambiguous object references.

The invention also encompasses a computer-readable medium, a computer system, and a computer data signal embodied in a carrier wave, configured to carry out the foregoing steps.

DESCRIPTION OF THE DRAWINGS

The present invention is illustrated by way of example, and not by way of limitation, in the figures of the accompanying drawings and in which like reference numerals refer to similar elements and in which:

FIG. 3A is a user window that illustrates an example of the type of SQL statement information that may be presented to a user of the system;

FIG. 4 is a flow diagram that illustrates a method for removing ambiguities in an SQL statement.

DETAILED DESCRIPTION OF THE PREFERRED EMBODIMENT

A disambiguation mechanism for removing ambiguities in shared database commands is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW

A disambiguation mechanism is provided for identifying which schema context issued a particular database command. More specifically, the mechanism identifies those schema contexts that can reference all ambiguous objects that are contained in the database command. For the purpose of explanation, embodiments shall be described in the context of a database system in which database commands are in the form of SQL statements. However, the present invention is not limited to any particular type or version of database language.

In one embodiment, in response to being provided with a SQL statement that includes a set of object references, the disambiguation mechanism determines which of the object references are ambiguous. To determine the set of ambiguous object references, the disambiguation mechanism filters out all object references that are explicitly qualified (i.e. those object references that include a specific schema) and all object references that are Public synonyms (i.e. those object references that are globally available to the different schemas).

Once the set of ambiguous object references is determined, the disambiguation mechanism identifies the set of "valid" user schemas that can reference all of the ambiguous objects. The set of valid user schemas represents the group of schemas that can issue the SQL statement to the database without error. The schema context that actually issued the query will belong to that set.

According to one embodiment, the set of valid user schemas is then presented to a user, which typically will be the DBA for the database system. The user can then select one of the valid user schemas in order to remove any ambiguities in the referenced objects.

In one embodiment, in response to the user selecting a valid user schema, the disambiguation mechanism prepends the selected schema name to each of the ambiguous object references. By prepending the selected schema to each ambiguous reference, the disambiguation mechanism can remove all ambiguities that may have previously existed in the SQL statement.

DETERMINING A SET OF AMBIGUOUS OBJECTS

Figure 1:
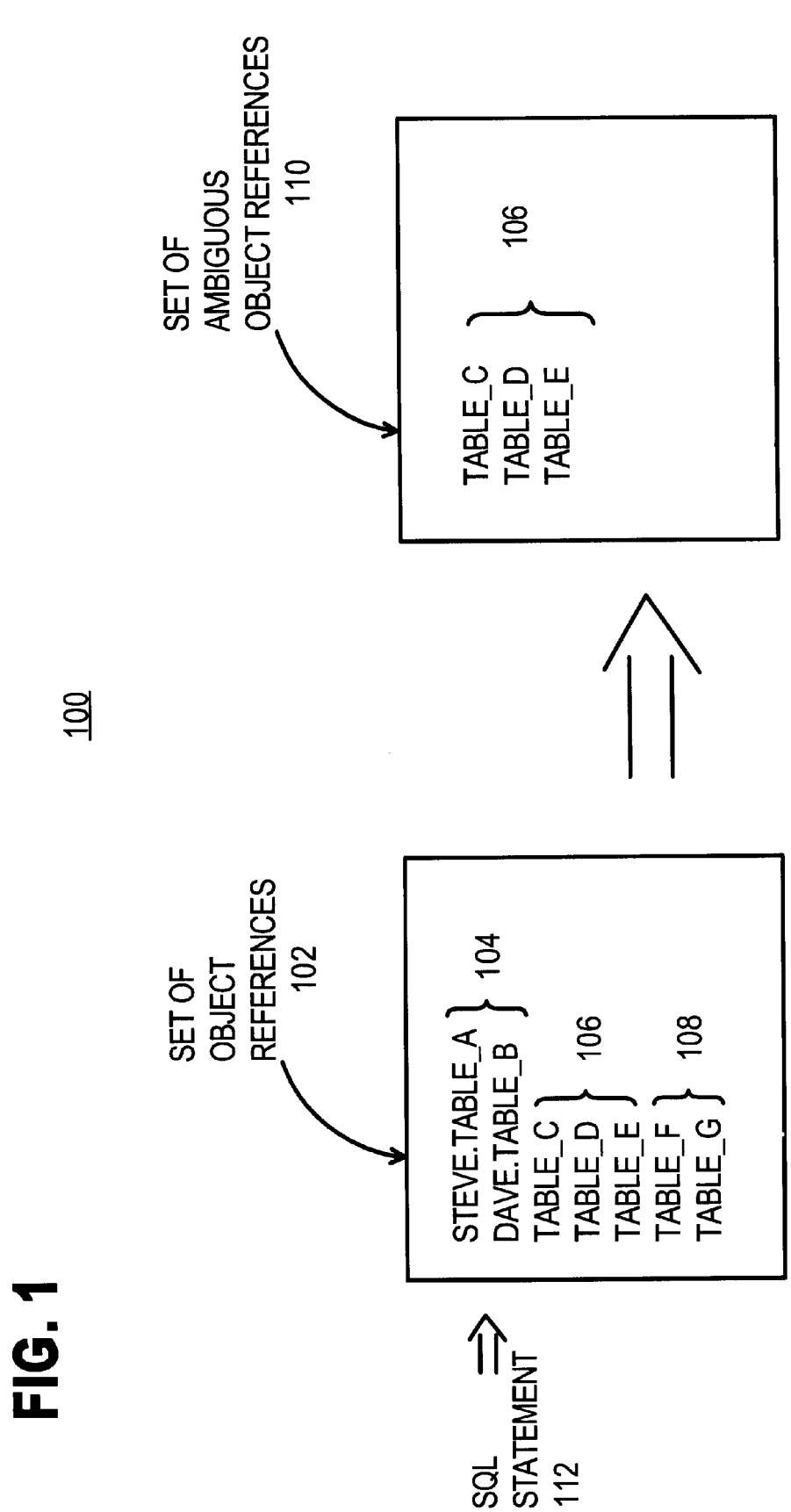
FIG. 1 is a block diagram illustrating a filtering phase for determining the set of ambiguous object references that are contained in an SQL statement.

FIG. 1 is a block diagram 100 illustrating a filtering phase for determining the set of ambiguous object references that are contained in an SQL statement. In implementing the filtering phase, an SQL statement 112 is initially parsed to identify a set of object references 102 that are included within the SQL statement 112. In one embodiment, the set of object references 102 represents the set of all table object references that are included within SQL statement 112. In the example shown in FIG. 1, the set of object references 102 include qualified object references 104 (STEVE.TABLE_A and DAVE.TABLE_B), ambiguous object references 106 (TABLE_C, TABLE_D and TABLE_E) and Public synonyms 108 (TABLE_F and TABLE_G). As previously indicated, a Public synonym is a type of global alias which transparently references a different schema object within the database system.

Once the set of object references 102 is determined, the filtering phase determines a set of ambiguous object references 110 by filtering out all non-ambiguous object references. In one embodiment, to determine the set of ambiguous object references 110, the filtering phase identifies all qualified object references and all Public synonyms that are included in the set of object references 102.

Identifying Schemas that Could Contain the Ambiguous Objects

Figure 2:
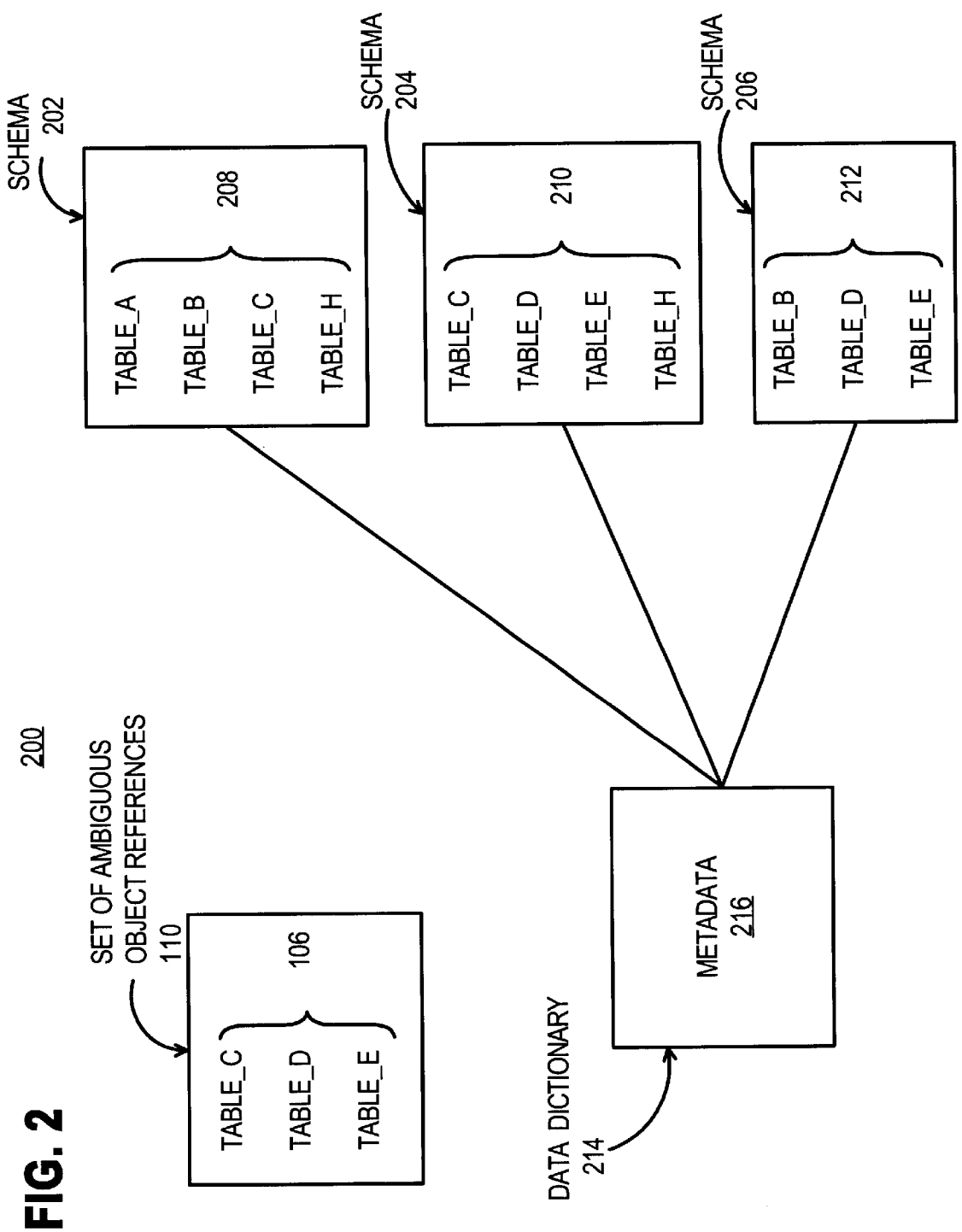
FIG. 2 is a block diagram illustrating a schema validation phase for identifying valid schemas that can resolve all ambiguous object references.

Upon completing the filtering phase, a schema validation phase is performed to identify the "valid" schemas that can resolve all of the ambiguous object references. FIG. 2 is a block diagram 200 illustrating a schema validation phase for identifying "valid" schemas that can resolve all of the ambiguous object references. In one embodiment, in implementing schema validation phase, the objects associated with one or more schemas are compared to set of ambiguous object references 110 that were previously identified in the filtering phase. In certain embodiments of the invention, a data dictionary is used to determine the ambiguous objects that can be resolved by the different schemas.

For example, data dictionaries include metadata that describes all of the objects that are contained within the database, which schemas can access the different objects and in what schema a particular object resides. Thus, using the information contained in the data dictionary, the disambiguation mechanism can determine whether or not a particular schema context can correctly resolve an object reference.

In this example, data dictionary 214 includes metadata 216 that indicates that schema 202 can resolve object references 208 (TABLE_A, TABLE_B, TABLE_C and TABLE_H); that schema 204 can resolve object references 210 (TABLE_C, TABLE_D, TABLE_E and TABLE_H); and that schema 206 can resolve object references 212 (TABLE_B, TABLE_D and TABLE_E). Here, because schema 204 is the only schema that can resolve all ambiguous object references 106 (TABLE_C, TABLE_D and TABLE_E), the disambiguation mechanism determines schema 204 is the only "valid" schema. However, if multiple schemas had been capable of resolving all of the ambiguous object references, each of those schemas would be identified as "valid" schemas.

In certain cases, although a schema may include an object that corresponds to one of the ambiguous object references 106, the schema may not have the required privileges for accessing the object as required by the SQL statement. For example, although a particular schema "X" may include the object "TABLE_A", in accessing "TABLE_A", schema "X" may only have "read" privileges and not "update" privileges. Thus, if operations within the SQL statement require that a row be updated in "TABLE_A", the SQL statement cannot be correctly performed using schema "X". In one embodiment, in determining whether a schema is a "valid" schema, the disambiguation mechanism determines whether the privileges associated with the schema are such that the operations in the SQL statement can be correctly applied to each of the ambiguous object 106.

According to one embodiment, even when a schema has a table with the same name as an ambiguously reference table of a query, the schema is not considered valid if (1) the query specifies a column of the table, and (2) the table within the schema does not have the specified column. For example, a query may ambiguously reference "emp" and include the clause "WHERE emp.salary=$50,000". If a schema "X" has a table "emp", but the table "emp" within schema "X" does not have a column named "salary", then schema "X" does not qualify as a "valid" schema for the query.

GENERATING AN EXPLAIN PLAN BASED ON A VALID SCHEMA

In one embodiment, after determining the set of valid schemas, the disambiguation mechanism displays a list of one or more valid schemas to the user. In certain embodiments, whenever the disambiguation mechanism identifies only a single valid schema, the disambiguation mechanism automatically generates an explain plan based on the valid schema. Alternatively, when more than one valid schema is listed, the user may select one of the valid schemas for generating an explain plan. In this context, an explain plan is a graphical representation of how the database optimizer has chosen to retrieve the results from the query. In particular, the explain plan describes the order in which the results are being retrieved, the indices that are used to retrieve the results and the type of data accessing mechanism (i.e. a hash join or Cartesian product) that is used in retrieving the results.

For example, FIG. 3A depicts a window 300 which includes a plurality of frames 302, 304 and 306. In this example, frame 302 includes an SQL statement 310 which contains ambiguous object references 312 and 314 (emp and dept). Frame 304 includes a list of valid schemas 308 (STEVE, JIM and BOB) for SQL statement 310. Associated with frame 306 is an explain option button 316, a compact view button 318 and a statistics button 320 which may be used to determine what information is displayed in frame 306.

In one embodiment, in response to a user selecting a schema from the list of valid schemas 308, the disambiguation mechanism automatically qualifies the ambiguous object references in SQL statement 310 by prepending the selected schema name to each ambiguous object reference 312 and 314. For example, in response to selecting the schema "STEVE", the disambiguation mechanism automatically updates SQL statement 310 to qualify the ambiguous object reference 312 and 314 as follows:

SELECT *
   FROM STEVE.emp, STEVE.dept

Figure 3B:
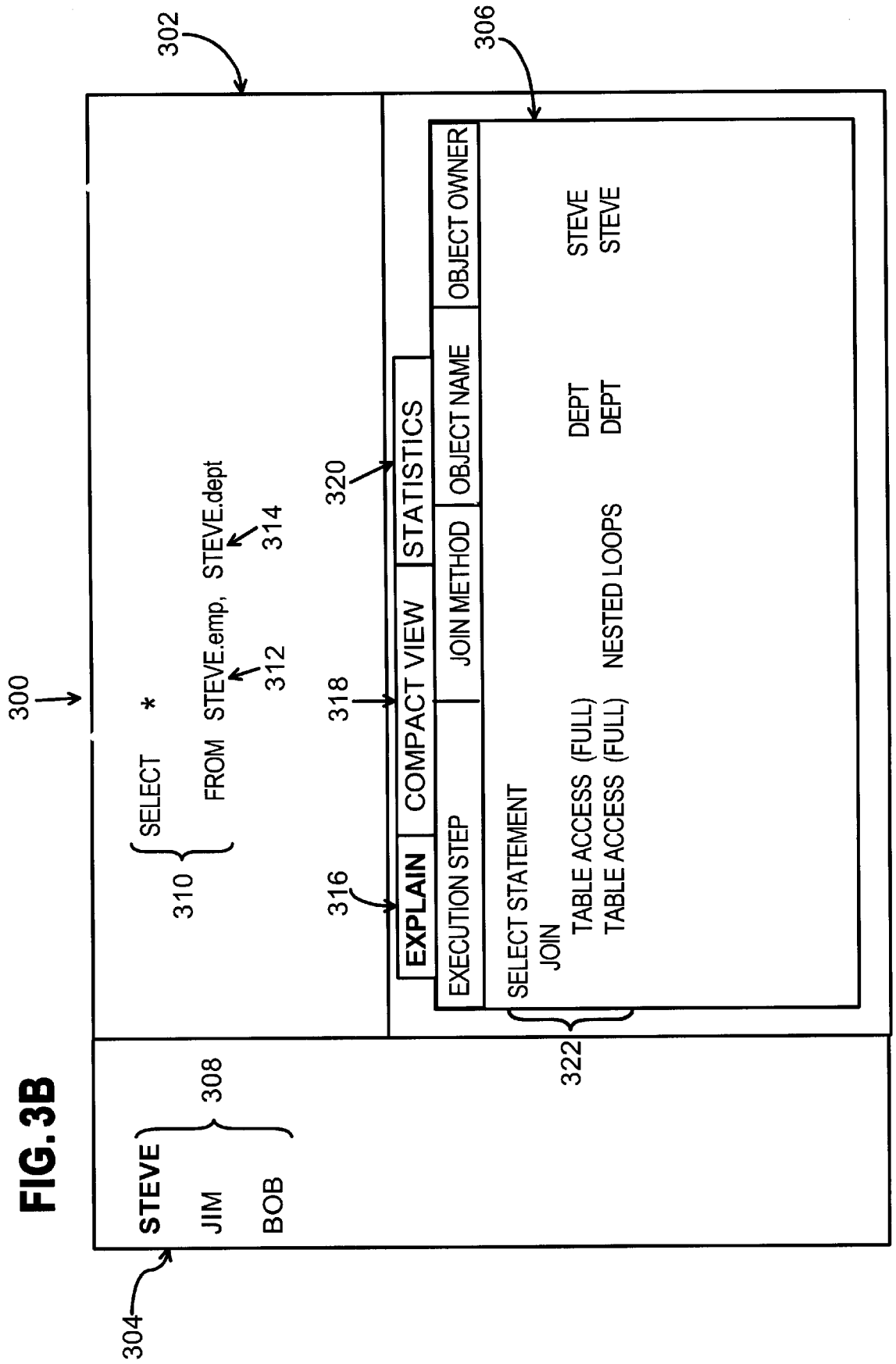
FIG. 3B further illustrates an example of the type of SQL statement information that may be presented to a user of the system.

In one embodiment, after updating the SQL statement, if the user selects the explain button 316 the disambiguation mechanism displays an explain plan based on the updated SQL statement. For example, FIG. 3B illustrates an explain plan 322 for SQL statement 310 as qualified by schema "STEVE". As depicted, explain plan 322 identifies the executions steps, join methods, object names and object owner (i.e. schema context) for SQL statement 310 as qualified by schema "STEVE".

Figure 3C:
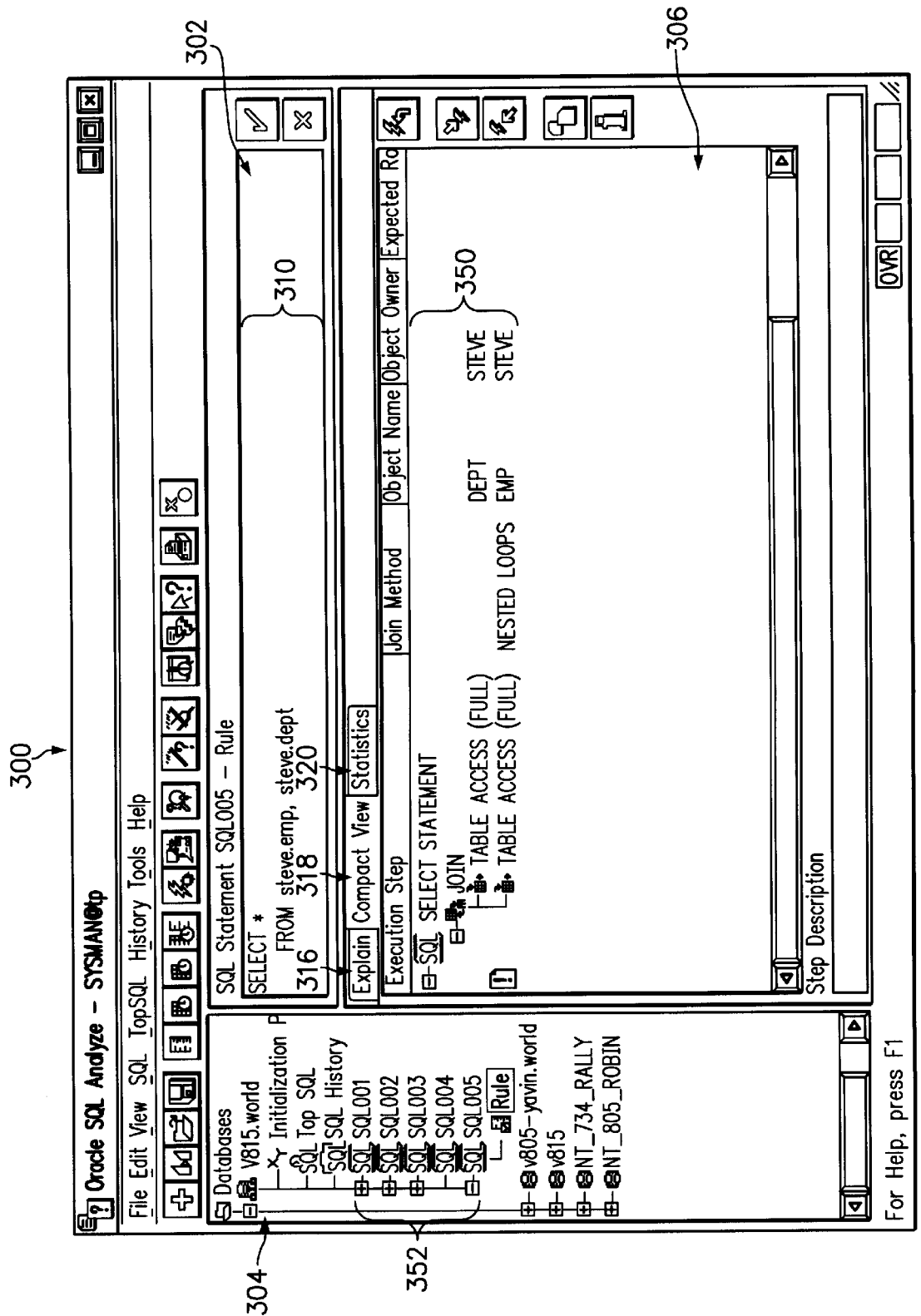
FIG. 3C further illustrates an example of the type of SQL statement information that may be presented to a user of the system.

As another example, FIG. 3C illustrates a currently implemented view of window 300 in which the disambiguation mechanism has displayed an explain plan 350 based on SQL statement 310 as qualified by schema "STEVE". In this example, frame 304 contains a graphical directory structure that includes a set of SQL statements 352 from which the user may select for tuning.

Figure 3D:
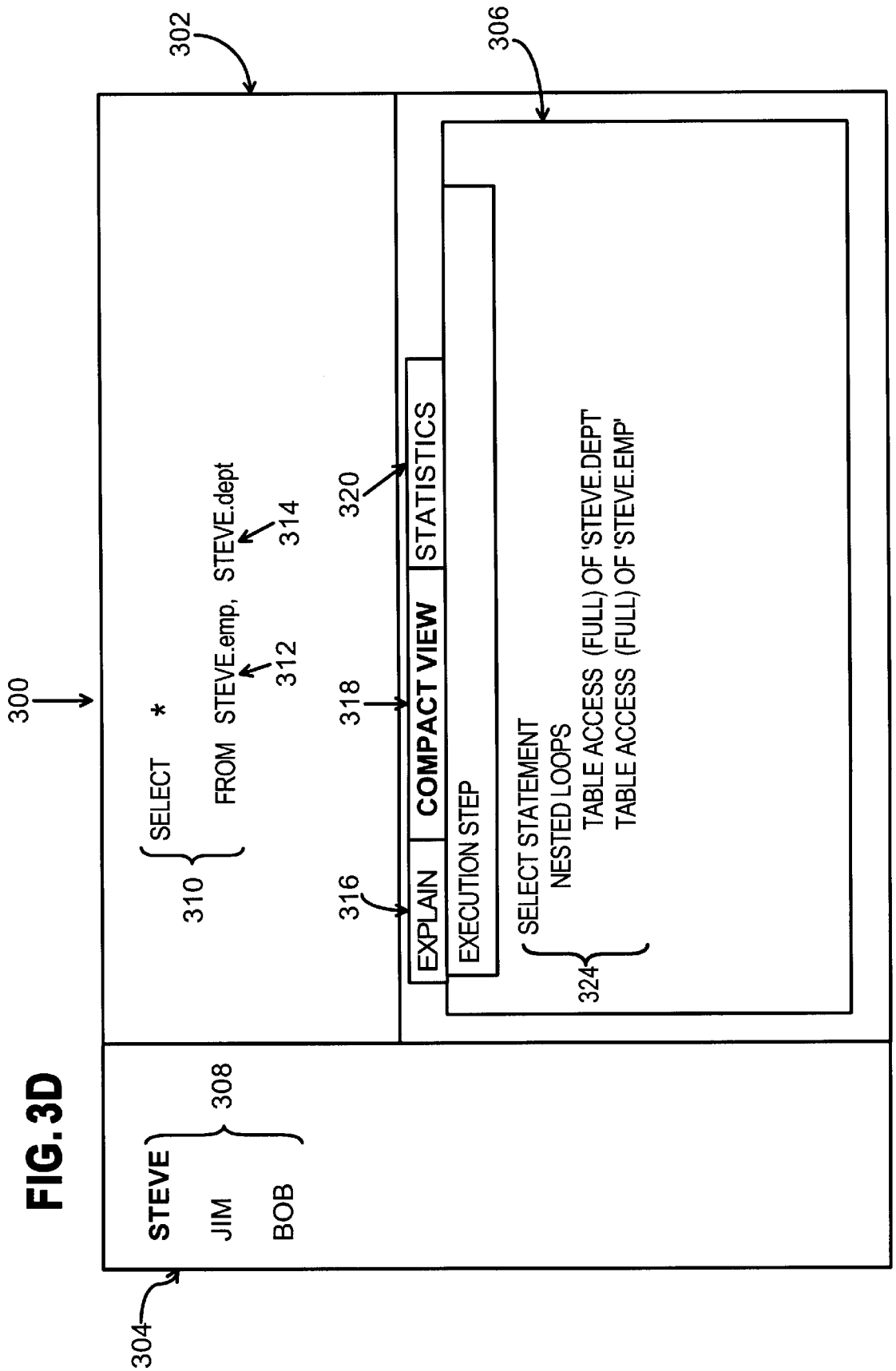
FIG. 3D further illustrates an example of the type of SQL statement information that may be presented to a user of the system.
Figure 3E:
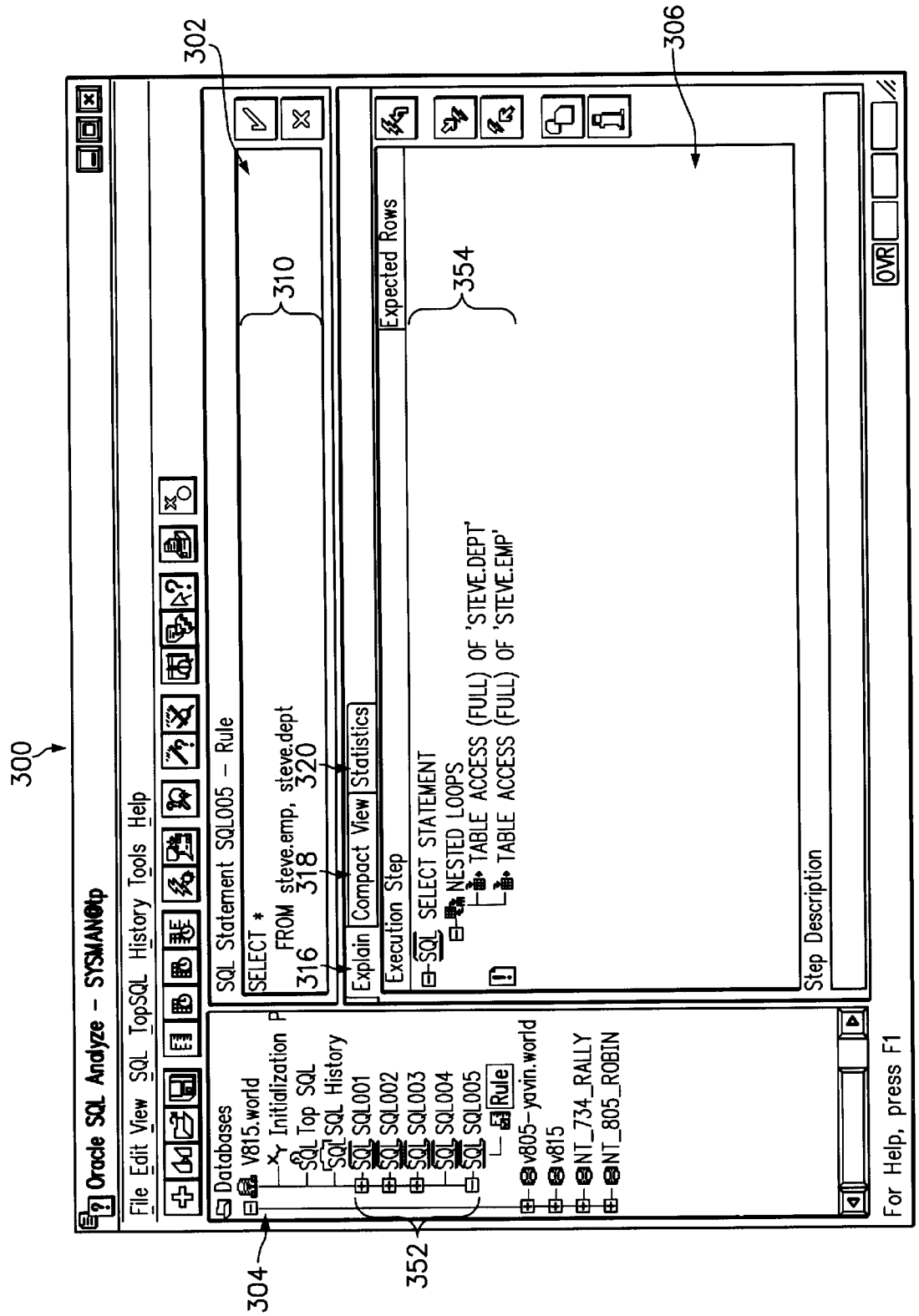
FIG. 3E further illustrates an example of the type of SQL statement information that may be presented to a user of the system.

Alternatively, if the user selects compact view button 318, the disambiguation mechanism displays a compact view of the explain plan based on the updated SQL statement. For example, FIG. 3D illustrates a compact view 324 of the explain plan 322. As depicted, compact view 324 provides a condensed view of the execution steps that are performed for SQL statement 310. Additionally, FIG. 3E illustrates a currently implemented view of window 300 in which the disambiguation mechanism has displayed a compact view 354 based on SQL statement 310 as qualified by schema "STEVE".

Figure 3F:
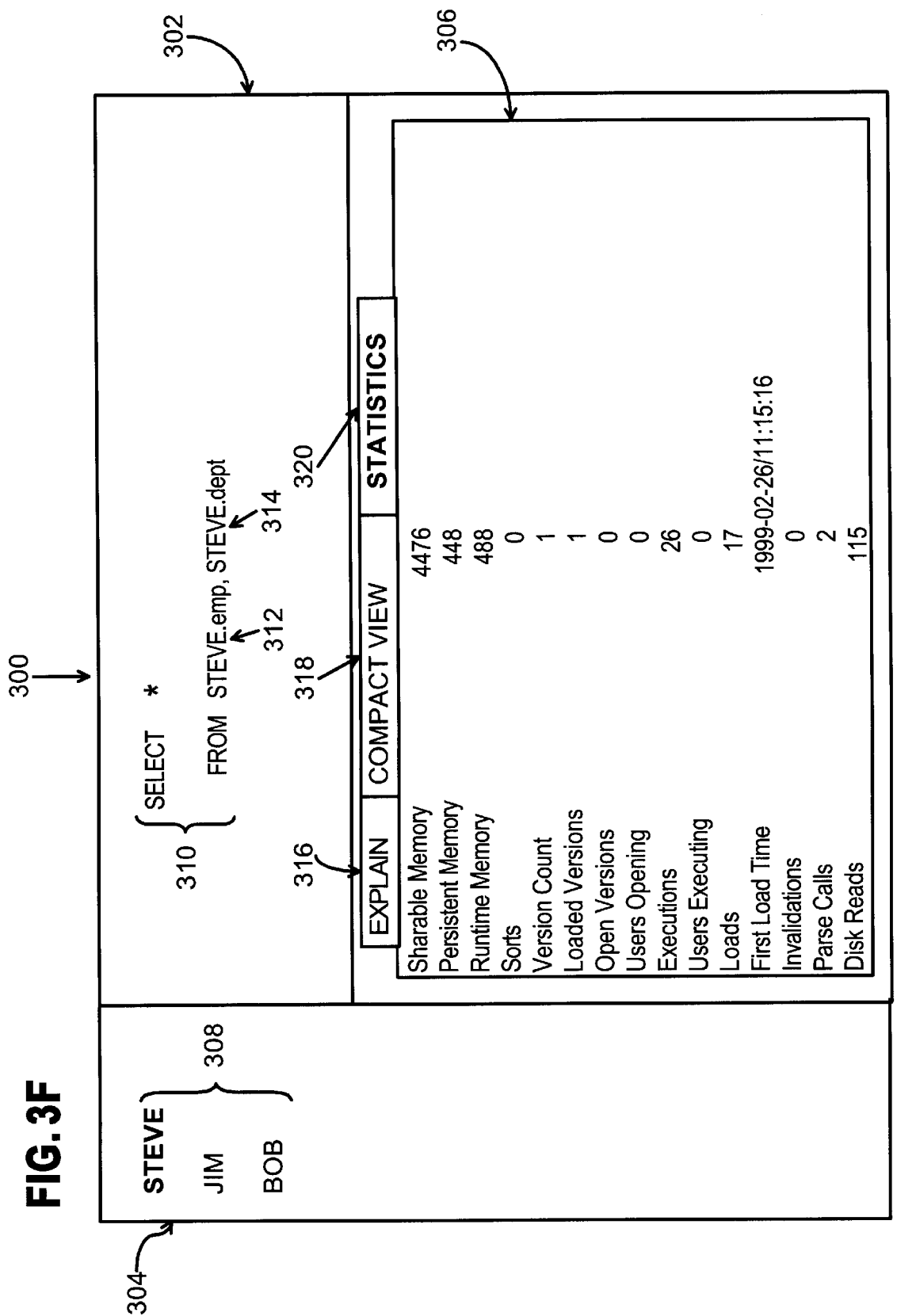
FIG. 3F further illustrates an example of the type of SQL statement information that may be presented to a user of the system.

As still another option, if the user selects statistics button 320, the disambiguation mechanism displays the statistics from executing the explain plan based on the updated SQL statement. For example, FIG. 3F illustrates an example of a set of statistics 326 for executing explain plan 322 based on the updated SQL statement 310.

REMOVING AMBIGUITIES FROM AN SQL STATEMENT

FIG. 4 depicts a flow diagram that illustrates a method for removing ambiguities in an SQL statement in accordance with an embodiment of the invention. For explanation purposes, the steps of FIG. 4 shall be explained with reference to the components of FIG. 1 and FIG. 2.

At step 402 an SQL statement is provided to the disambiguation mechanism for analysis. Various techniques may be used to provide an SQL statement to the disambiguation mechanism. For example, the SQL statement may be provided in response to the DBA selecting and dragging the SQL statement from a list of one or more SQL statements that are displayed to the DBA on a display unit. Alternatively, the SQL statement may be provided in response to the DBA entering the SQL statement at a prompt that is provided in a user interface window.

At step 404, a filtering phase is performed to identify ambiguous object references that are contained in the SQL statement. To perform the filtering phase, at step 406, a set of possible ambiguous object references is identified that includes all object references that are contained in the SQL statement. In one embodiment, a parse tree, which is built based on the objects referenced in the SQL statement, is used to identify the object references that are contained in the SQL query.

At step 408, all qualified object references are removed from the set of possible ambiguous object references. In one embodiment, to remove the qualified object references, each object reference is examined to determine whether it includes a schema identifier that qualifies the schema for which the object is to execute. For example, as previously described in FIG. 1, the object reference "STEVE.TABLE_ A"includes the schema qualifier "STEVE" which identifies the object "TABLE_A" as being executed in the schema "STEVE". Alternatively, the object reference "TABLE_C" does not include a schema qualifier that identifies the schema for which the object is to execute.

At step 410, all Public synonyms are removed from the remaining set possible ambiguous object references. As previously described, a public synonym is an object identifier that does not require a schema to be qualified. Thus, a schema qualifier is not required to qualify a public synonym as all references to a public synonym are to the same public object regardless of the schema in which the SQL statement is executed.

At step 412, a schema identification phase is performed to identify the "valid" schemas that can be used to correctly execute the operations contained in the SQL statement.

To perform the schema identification phase, at step 414, the disambiguation mechanism determines a set of "possible valid" schemas by identifying the schemas that can resolve all of the ambiguous object references.

At step 416, the disambiguation mechanism determines from the set of "possible valid" schemas, those schemas that include the necessary privileges that will allow them to perform the operations are required on the set of object references.

At step 418, a list of one or more "valid" schemas is presented to the user. The user may then select a particular schema from the list to generate an explain plan and to retrieve the metrics from executing the SQL statement in the selected schema context. In certain embodiments, if the set of "possible valid" schemas contains only a single "valid" schema, the disambiguation mechanism automatically generates an explain plan based on the single "valid" schema. In one embodiment, if the set of "possible valid" schemas contains only a single "valid" schema, the explain plan is generated without presenting a list of one or more "valid" schemas to the user.

Hardware Overview

Figure 5:
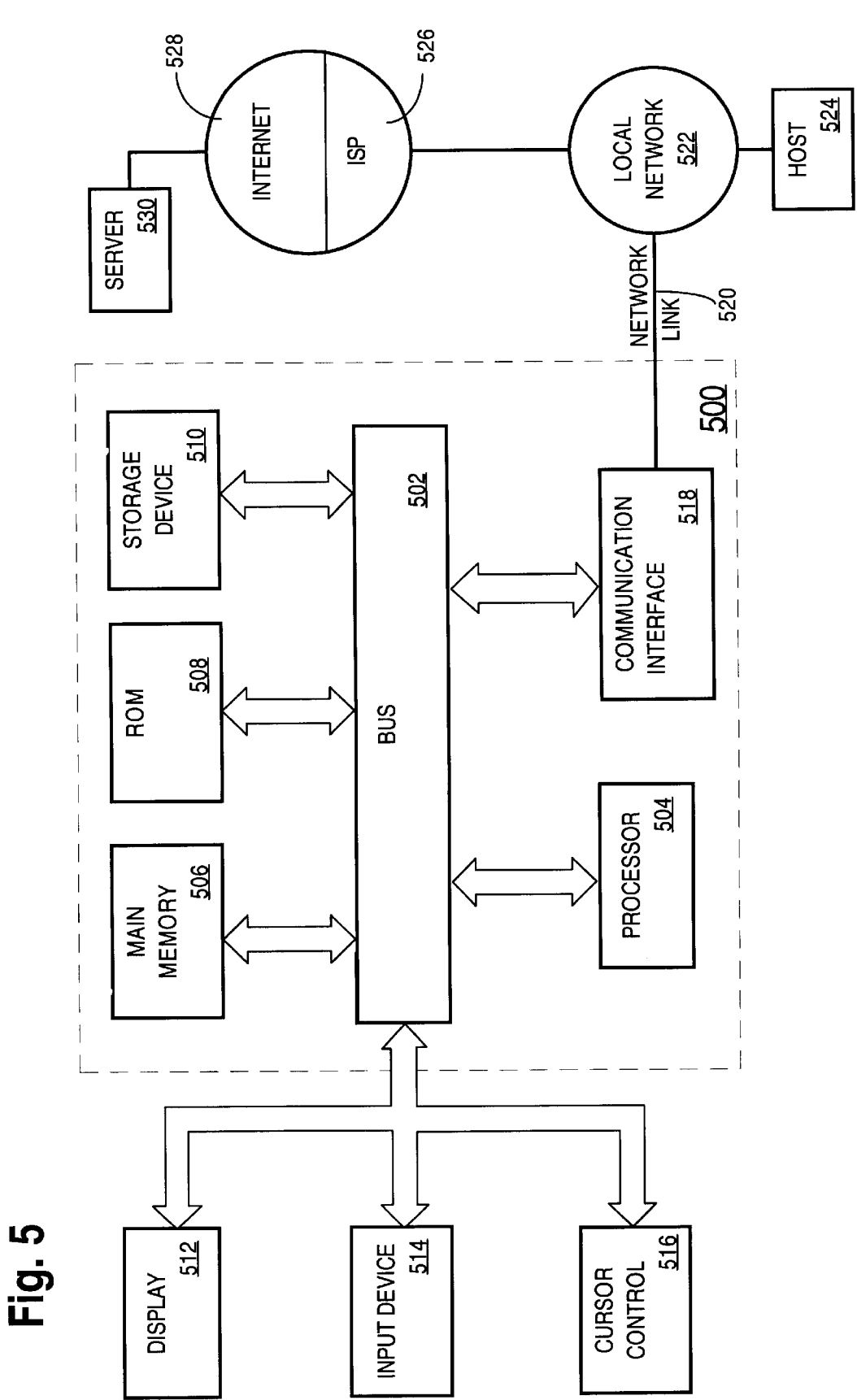
FIG. 5 is a block diagram of a computer system hardware arrangement that can be used to implement aspects of the invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for removing ambiguities in a shared SQL statement. According to one embodiment of the invention, removal of ambiguities in a shared SQL statement is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for removing ambiguities in a shared SQL statement as described herein.

The received code may be executed by processor 504 as it is received, and/or stored in storage device 510, or other non-volatile storage for later execution. In this manner, computer system 500 may obtain application code in the form of a carrier wave.

Extentions and Alternatives

The foregoing specification describes a disambiguation mechanism in which ambiguities are removed from SQL statements that contain ambiguous object references. By the removing ambiguities from an SQL statement, a DBA can determine how the SQL statement may be tuned to cause it to execute more efficiently. In particular, once the ambiguities in an SQL statement are resolved, an explain plan can be generated to determine if a modification can be made to database, or to the application program that issued the query, to reduce amount of resources that are required to execute the SQL statement.

In the foregoing specification, the invention has been described with reference to specific embodiments thereof. It will, however, be evident that various modifications and changes may be made thereto without departing from the broader spirit and scope of the invention. Thus, the specification and drawings are, accordingly, to be regarded in an illustrative rather than a restrictive sense.

In addition, although certain examples were described based on an Oracle™ database system, the described mechanism is not limited to any particular database system.

Within this disclosure, including the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for identifying one or more schemas from which a database command may have been executed, the method comprising the steps of:

determining a set of object references that are included in the database command;

identifying one or more ambiguous object references that are contained in the set of object references; and determining a set of one or more schemas that contain objects that correspond to each of the one or more ambiguous object references.

2. The method of claim 1, wherein the step of identifying one or more ambiguous object references includes the steps of:

identifying any qualified object references from the set of object references, wherein each qualified object reference is associated with a schema identifier that identifies a particular schema for which the qualified object reference is to execute;

identifying any public synonyms from the set of object references, wherein each public synonym represents an alias that may be used in multiple schemas to identified a single object; and determining the one or more ambiguous object references by selecting from the set of object references, only those object references that have not been identified as either qualified object references or public synonyms.

3. The method of claim 1, further comprising the steps of:

receiving user input that identifies, from said set of one or more schemas, a selected schema for which tuning is to be performed; and generating an explain plan for the database command based on the selected schema by associating a schema identifier that identifies the selected schema with each of the one or more ambiguous object references.

4. The method of claim 1, wherein the step of determining the set of one or more schemas includes the step of identifying schemas that include a set of access permissions for accessing the one or more ambiguous object references as required by the database command.

5. The method of claim 1, wherein the step of determining a set of one or more schemas includes the step of:

for each of the one or more ambiguous object references, accessing a data dictionary to identify schemas that include objects that are associated with all ambiguous object references.

6. The method of claim 1, further comprising the steps of:

displaying a set of one or more database commands in a first window; and receiving user input that selects one of the one or more database commands displayed in the first window.

7. The method of claim 1, further comprising the steps of:

displaying a user input dialog box on a display monitor; and receiving user input that defines a particular database command.

8. A computer-readable medium carrying one or more sequences of one or more instructions for identifying one or more schemas from which a database command may have been executed, the one or more sequences of one or more instructions including instructions which, when executed by one or more processors, cause the one or more processors to perform the steps of:

determining a set of object references that are included in the database command;

identifying one or more ambiguous object references that are contained in the set of object references; and determining a set of one or more schemas that contain objects that correspond to each of the one or more ambiguous object references.

9. The computer-readable medium of claim 8, wherein the step of identifying one or more ambiguous object references includes the steps of:

identifying any qualified object references from the set of object references, wherein each qualified object reference is associated with a schema identifier that identifies a particular schema for which the qualified object reference is to execute;

identifying any public synonyms from the set of object references, wherein each public synonym represents an alias that may be used in multiple schemas to identified a single object; and determining the one or more ambiguous object references by selecting from the set of object references, only those object references that have not been identified as either qualified object references or public synonyms.

10. The computer-readable medium of claim 8, further comprising instructions for performing the steps of:

receiving user input that identifies, from said set of one or more schemas, a selected schema for which tuning is to be performed; and generating an explain plan for the database command based on the selected schema by associating a schema identifier that identifies the selected schema with each of the one or more ambiguous object references.

11. The computer-readable medium of claim 8, wherein the step of determining the set of one or more schemas includes the step of identifying schemas that include a set of access permissions for accessing the one or more ambiguous object references as required by the database command.

12. The computer-readable medium of claim 8, wherein the step of determining a set of one or more schemas includes the step of:

for each of the one or more ambiguous object references, accessing a data dictionary to identify schemas that include objects that are associated with all ambiguous object references.

13. The computer-readable medium of claim 8, further comprising instructions for performing the steps of:

displaying a set of one or more database commands in a first window; and receiving user input that selects one of the one or more database commands displayed in the first window.

14. The computer-readable medium of claim 8, further comprising instructions for performing the steps of:

displaying a user input dialog box on a display monitor; and receiving user input that defines a particular database command.

15. A computer system for identifying one or more schemas from which a database command may have been executed, the computer system comprising:

a memory;

one or more processors coupled to the memory; and a set of computer instructions contained in the memory, the set of computer instructions including computer instructions which when executed by the one or more processors, cause the one or more processors to perform the steps of:

determining a set of object references that are included in the database command;

identifying one or more ambiguous object references that are contained in the set of object references; and determining the one or more schemas that contain each of the one or more ambiguous object references.

16. The computer system of claim 15, wherein the step of identifying one or more ambiguous object references includes the steps of:

identifying any qualified object references from the set of object references, wherein each qualified object reference is associated with a schema identifier that identifies a particular schema for which the qualified object reference is to execute;

identifying any public synonyms from the set of object references, wherein each public synonym represents an alias that may be used in multiple schemas to identified a single object; and determining the one or more ambiguous object references by selecting from the set of object references only those object references that have not been identified as either qualified object references or public synonyms.

17. The computer system of claim 15, further comprising the steps of:

receiving user input that identifies, from said set of one or more schemas, a selected schema for which tuning is to be performed; and generating an explain plan for the database command based on the selected schema by associating a schema identifier that identifies the selected schema with each of the one or more ambiguous object references.

18. The computer system of claim 15, wherein the step of determining the set of one or more schemas includes the step of identifying schemas that include a set of access permissions for accessing the one or more ambiguous object references as required by the database command.

19. The computer system of claim 15, wherein the step of determining a set of one or more schemas includes the step of:

for each of the one or more ambiguous object references, accessing a data dictionary to identify schemas that include objects that are associated with all ambiguous object references.

20. The computer system of claim 15, further comprising the steps of:

displaying a set of one or more database commands in a first window; and receiving user input that selects one of the one or more database commands displayed in the first window.

21. The computer system of claim 15, further comprising the steps of:

displaying a user input dialog box on a display monitor; and receiving user input that defines a particular database command.

\* \* \* \* \*